(12) United States Patent
Yang

(10) Patent No.: US 10,673,044 B2
(45) Date of Patent: Jun. 2, 2020

(54) ELECTRICAL INSULATOR AND ITS RELATED BATTERY

(71) Applicants: Prologium Technology Co., Ltd., Taoyuan (TW); Prologium Holding Inc., Grand Cayman (KY)

(72) Inventor: Szu-Nan Yang, Taoyuan (TW)

(73) Assignees: PROLOGIUM TECHNOLOGY CO., LTD., Taoyuan (TW); PROLOGIUM HOLDING INC., Grand Cayman (KY)

( * ) Notice: Subject to any disclaimer, the term of this patent is extended or adjusted under 35 U.S.C. 154(b) by 252 days.

(21) Appl. No.: 15/727,698

(22) Filed: Oct. 9, 2017

(65) Prior Publication Data

US 2018/0108893 A1    Apr. 19, 2018

Related U.S. Application Data

(60) Provisional application No. 62/407,565, filed on Oct. 13, 2016.

(51) Int. Cl.
*H01M 2/16* (2006.01)
*H01M 2/18* (2006.01)
*H01M 10/42* (2006.01)

(52) U.S. Cl.
CPC ....... *H01M 2/1686* (2013.01); *H01M 2/1646* (2013.01); *H01M 2/1653* (2013.01); *H01M 2/18* (2013.01); *H01M 10/4235* (2013.01)

(58) Field of Classification Search
CPC .......... H01M 2/1686; H01M 10/4235; H01M 2/1653; H01M 2/1646; H01M 2/18
See application file for complete search history.

(56) References Cited

U.S. PATENT DOCUMENTS

| 2002/0119367 A1* | 8/2002 | Watanabe | H01M 2/18 429/129 |
| 2016/0056437 A1* | 2/2016 | Huang | H01M 2/145 429/144 |
| 2017/0346060 A1* | 11/2017 | Visco | H01G 11/06 |

* cited by examiner

*Primary Examiner* — Lisa S Park
(74) *Attorney, Agent, or Firm* — Rabin & Berdo, P.C.

(57) ABSTRACT

An electrical insulator and its related battery are provided. The electrical insulator includes a separation region and a supporting region. The supporting region covers the edge of at least one of opposite surfaces of the separation region and at least a part of a lateral surface of the separation region. The battery includes the electrical insulator. The electrical insulator is disposed between cathode and anode active material layers of the battery and contacts the active material layers directly. The cathode and the anode active material layers are completely electrically isolated because the electrical insulator totally covers at least one active material layer. Hence, the inner short of the battery is prevented.

21 Claims, 4 Drawing Sheets

ELECTRICAL INSULATOR AND ITS RELATED BATTERY

This Non-provisional application claims priority under 35 U.S.C. § 119(a) on Patent Application No. 62/407,565 filed in United States on Oct. 13, 2016, the entire contents of which are hereby incorporated by reference.

BACKGROUND

1. Technical Field

The present invention is related to an electrical insulator, and especially related to an electrical insulator and its related battery.

2. Description of Related Art

Conventionally, to prevent an inner short of a battery, a separator must be interposed between the cathode and anode. The materials of the separator usually are polyethylene or polypropylene. The separator which uses these materials will easily curl under high temperature operations. Although the sizes of the separator are always designed to be larger than the surface area of the cathode and anode, the cathode and the anode will still contact and cause an inner short of the battery when the separator is curled. With the heat generated by inner short, the separator will curl more seriously. Hence, a comprehensive inner short will be triggered, and the thermal runaway will occur.

To solve the abovementioned problems, a ceramic coated separator has been developed. The ceramic coated separator can undertake under high temperature operations via the characteristics of ceramic. However, the separator is still composed of polymer (e.g., polyethylene, polypropylene), and the structure of polymer will change because of the heat accumulation under high temperature operations. The separator will still curl and cause inner short. At last, the thermal runaway may still occur.

Accordingly, an electrical insulator and its related battery is disclosed in the present disclosure to overcome the above problems.

SUMMARY OF THE INVENTION

The present invention is to provide an electrical insulator and its related battery, which can improve the structural strength of the edge of the separation region via the supporting region of the electrical insulator, so that the electrical insulator will not easily curl under high temperature operations.

The present invention is to provide an electrical insulator and its related battery. The supporting region covers the edge of the separation region, so that the edge of the separation region will not easily crack, and the probability of an inner short can be reduced.

The present invention is to provide an electrical insulator and its related battery, of which the process of assembling can be simplified via adhering the supporting region of the electrical insulator and the package structure of the battery to each other.

To achieve the abovementioned object, the present disclosure discloses an electrical insulator. The electrical insulator includes a separation region and a supporting region. The separation region has two surfaces and a lateral surface. The supporting region covers the edge of at least one of the surfaces.

To achieve the abovementioned object, the present disclosure discloses a battery. The battery includes two electrodes, an electrical insulator and a package structure. The package structure packages the electrodes and the electrical insulator. The electrical insulator has a separation region and a supporting region. The separation region is disposed between the active material layers and contacts the active material layers. The supporting region is disposed between the active material layers and at least parts of the supporting region contact the active material layers.

To achieve the abovementioned object, the present disclosure discloses a battery. The battery includes two electrodes, an electrical insulator and a sealing frame. The sealing frame is adhered to the current collector of the electrodes and the supporting region of electrical insulator, so that the active material layer of the electrodes and the separation region of the electrical insulator can be sealed. The separation region is disposed between the active material layers and contacts the active material layers. The supporting region is disposed between the active material layers and at least a part of the supporting region contacts the active material layers.

In electrical insulator and its related battery of the present invention, the edge of the electrical insulator will not easily curl under high temperature operations. The probability of contact between the cathode and the anode can be reduced. Hence, the inner short of the battery can be prevented.

Below, the embodiments are described in detail in cooperation with the drawings to make easily understood the technical contents, characteristics and accomplishments of the present invention.

DETAILED DESCRIPTION

Please refer to the FIG. 1 to FIG. 6, illustrating six schematic diagrams of the electrical insulator of the present invention. The electrical insulator 1 includes a separation region 12 and a supporting region 14. The separation region 12 has two surfaces S1, S2 and a lateral surface S3. The supporting region 14 covers the edge of at least one of the surfaces S1 or S2 of the separation region 12.

Figure 1:
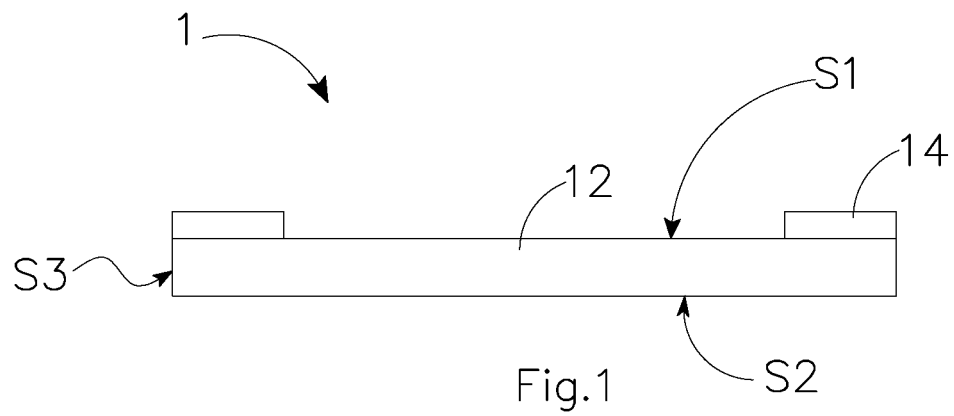
FIG. 1 is a schematic diagram of an embodiment of the electrical insulator of the present invention.
Figure 2:
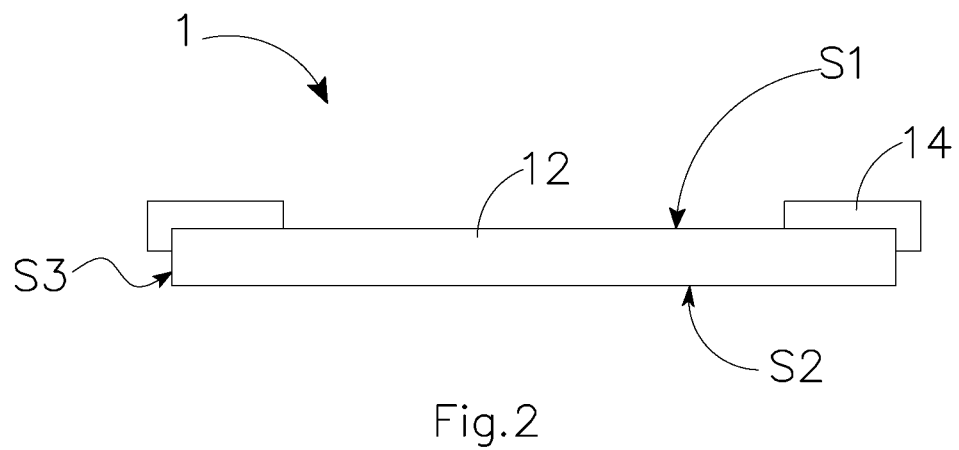
FIG. 2 is a schematic diagram of an embodiment of the electrical insulator of the present invention.
Figure 3:
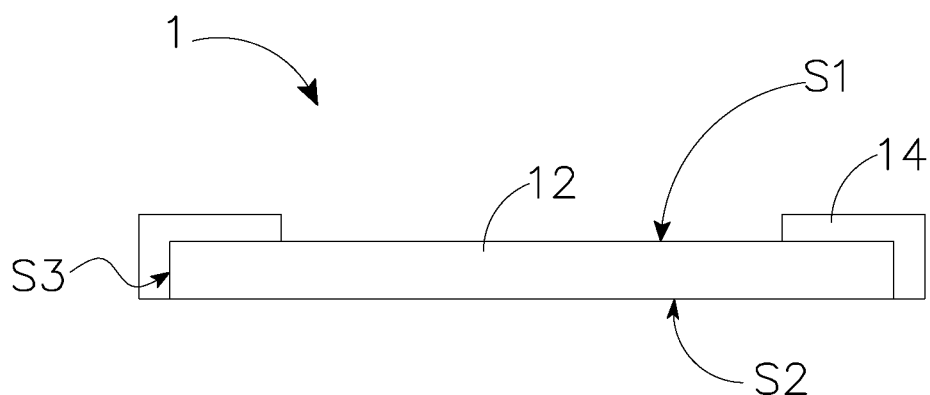
FIG. 3 is a schematic diagram of an embodiment of the electrical insulator of the present invention.

Referring to FIG. 1, the supporting region 14 covers the edge of the surface S1 of the separation region 12, but does not extend to cover the lateral surface S3 of the separation region 12. Referring to FIG. 2, the supporting region 14 covers the surface S1 of the separation region 12, and extends to cover parts of the lateral surface S3. Referring to FIG. 3, the supporting region 14 covers the surface S1 of the separation region 12, and extends to cover all the lateral surface S3.

Figure 4:
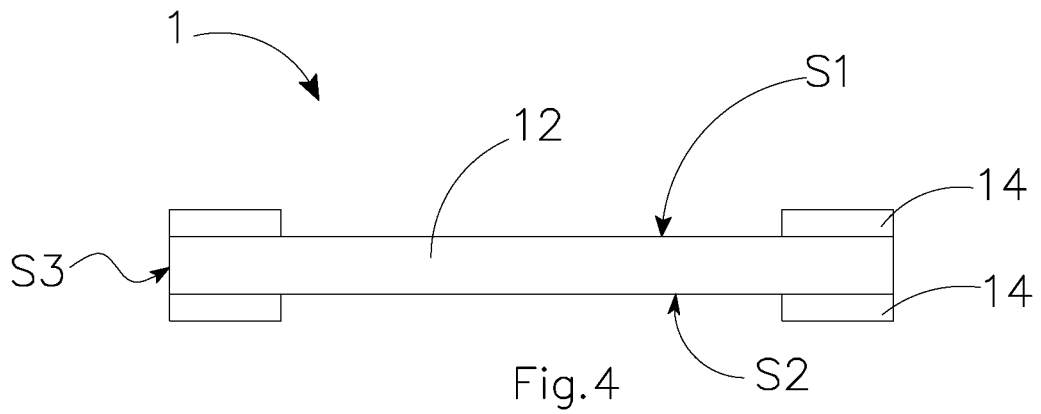
FIG. 4 is a schematic diagram of an embodiment of the electrical insulator of the present invention.
Figure 5:
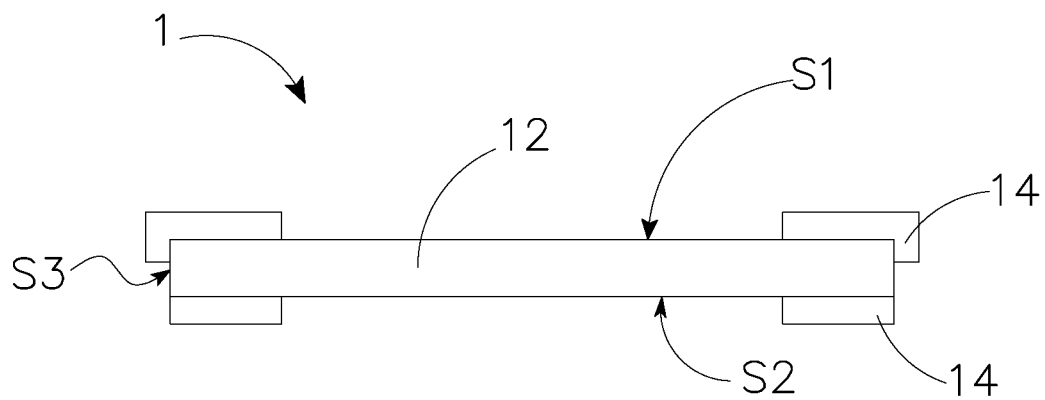
FIG. 5 is a schematic diagram of an embodiment of the electrical insulator of the present invention.
Figure 6:
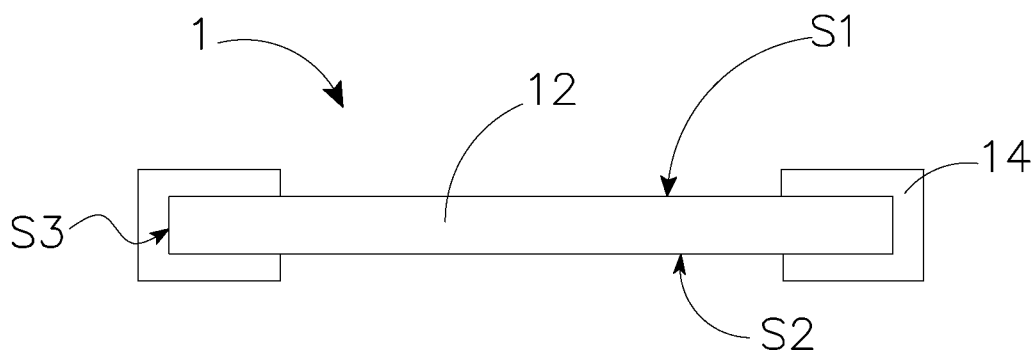
FIG. 6 is a schematic diagram of an embodiment of the electrical insulator of the present invention.

Referring to FIG. 4, the supporting region 14 covers the edge of the two surfaces S1 and S2 of the separation region 12, but does not extend to the lateral surface S3 of the separation region 12. Referring to FIG. 5, the supporting region 14 covers the two surfaces S1 and S2 of the separation region 12, and extends to cover parts of the lateral surface S3 from the surface S1. Referring to FIG. 6, the supporting region 14 covers the two surfaces S1 and S2 of the separation region 12, and extends to cover all of the lateral surface S3.

In the above embodiments, the separation region 12 is porous and ionic conductive. In actual operations, the separation region 12 can be formed by a ceramic separator, a polymer separator or a ceramic coated polymer separator. The supporting region 14 is flexible and ionic conductive. However, in electrical insulator 1, the main region for ion conduction is the separation region 12. The supporting region 14 can be made of some specific materials which are not ionic conductive. The supporting region 14 is made of polymer material, silicone material, epoxy resin material, acrylic material and a combination thereof. In addition, some supporting materials which are not ionic conductive, such as ceramic particles, polymer particles, may be added to improve the structural strength of the supporting region 14.

Figure 7:
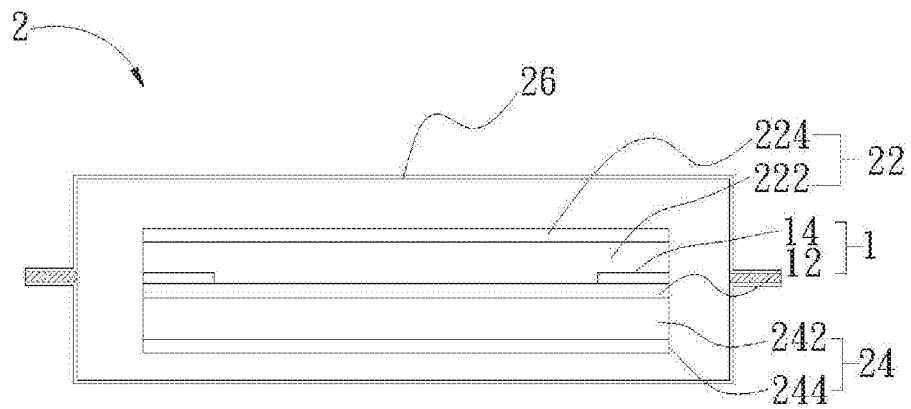
FIG. 7 is a schematic diagram of an embodiment of the battery of the present invention.
Figure 8:
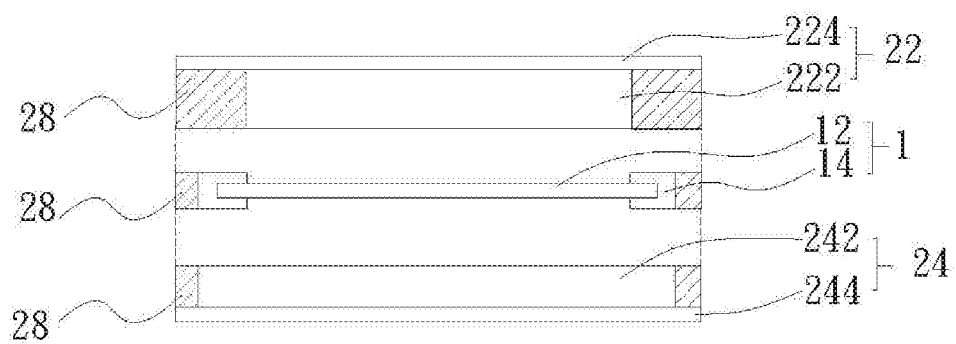
FIG. 8 is a schematic diagram of an embodiment of the battery of the present invention.
Figure 9:
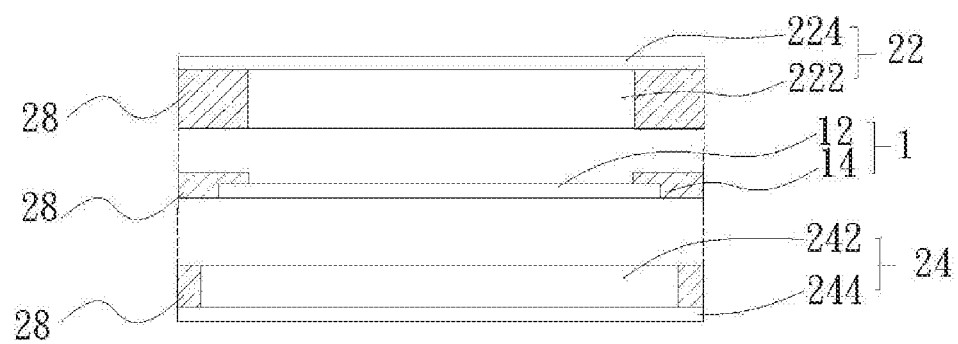
FIG. 9 is a schematic diagram of an embodiment of the battery of the present invention.

Please refer to FIG. 7 to FIG. 9, illustrating three schematic diagrams of the battery of the present invention.

FIG. 7 discloses a battery 2. The battery 2 includes two electrodes 22 and 24, an electrical insulator 1 and a package structure 26. The electrodes 22 and 24 have an active material layer 222 and 242, and a current collector 224 and 244, respectively. The separation region 12 of the electrical insulator 1 is disposed between the two active material layers 222 and 242, and contacts the active material layers 222 and 242. The supporting region 14 is disposed between the two active material layers 222 and 242, and contacts the active material layers 222 and 242 partly. Therefore, the supporting region 14 covers the active material layers 222 and 242 directly. The package structure 26 is an independent container to accommodate the electrodes 22, 24 and the electrical insulator 1. In FIG. 7, an aluminum laminated film package is illustrated. In this embodiment, the battery 2 may be a pouched battery or a flexible battery.

Moreover, referring to FIG. 8 and FIG. 9, the battery 2 includes two electrodes 22, 24, an electrical insulator 1 and a sealing frame 28. Similarly to the above embodiment, the separation region 12 is disposed between the two active material layers 222 and 242, and contacts the active material layers 222 and 242 at the same time. The supporting region 14 is disposed between the two active material layers 222 and 242, and contacts the active material layers 222 and 242 partly. Therefore, the supporting region 14 covers the active material layers 222 and 242 directly. Differently from the above embodiment, the sealing frame 28 is adhered to the current collectors 224, 244, and a part of the supporting region 14. The active material layers 222 and 242, and the separation region 12 of the electrical insulator 1 are completely sealed by the sealing frame 28, the current collectors 224 and 244, and parts of the supporting region 14. In these embodiments, the battery 2 may be a pouched battery or a flexible battery.

Figure 10:
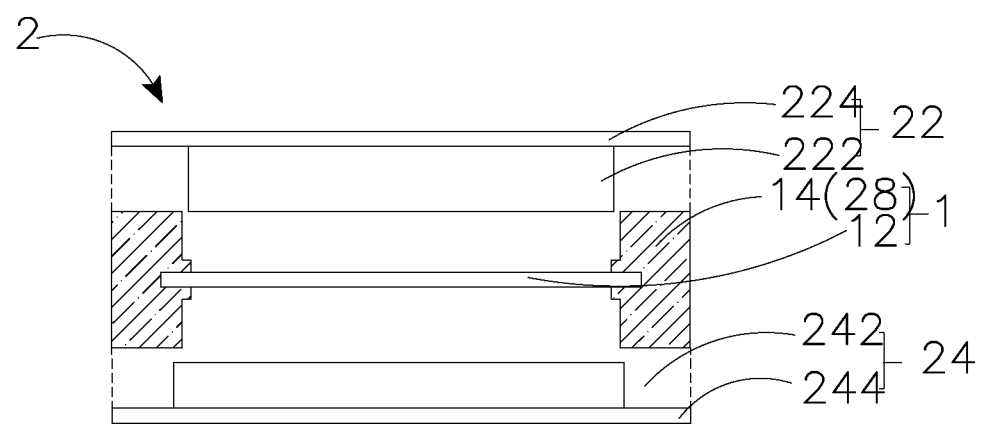
FIG. 10 is a schematic diagram of an embodiment of the battery of the present invention.

Moreover, referring to FIG. 10, the supporting region 14 and the sealing frame 28 are integrated into a single structure, so that the active material layers 222, 242 and the separation region 12 can completely sealed by the adhesion of the supporting region 14 and the current collectors 224 and 244.

In the above embodiments, in an orthographic projection view, the surface area of the electrical insulator, including the separation region and the supporting region, is larger than the surface area of the bigger one of the electrodes. However, considering safety issues, the negative electrode usually has a bigger surface area than the positive electrode. The present invention does not restrict the surface area of electrodes, but the electrical insulator must cover one of the electrodes completely. In the general design of a battery, the electrical insulator should cover the negative electrode surely.

In case the separation region of the electrical insulator is made of ceramic materials, for example, included in the separation region is a ceramic separator or a ceramic coated polymer separator, the edge of the separation region is easily cracked because of the characteristic of ceramics. Therefore, the separation region of the present invention has a smaller orthographic projection area than the orthographic projection area of one of the active material layers. The active material layer may be the positive active material layer or the negative active material layer. The separation region should cover the active material layer as much as possible, especially to make sure to cover the edge of the active material layer. However, the supporting region is disposed on the edge of the active material layer and the edge of the separation region to cover the lateral surface of the active material layer and the separation region. The supporting region has more flexibility than the separation region. Therefore, the edge of the separation region is not easily cracked. In addition, the supporting region can be ionic conductive or not ionic conductive according to the battery design. For example, the proportion of the positive active material and the negative active material (the surface area of the positive active material and the negative active material) is one of the factors to influence the battery design.

It is to be further understood that the present invention is not limited to the above embodiments. Any kind of the electrical insulators can be used in the above-mentioned batteries.

Although not illustrated, a protective layer can be disposed on any one of the outer surfaces of the current collectors. The major function of the protective layer is to isolate the current collector from external environment (oxidation, collision, etc.). Also, the protective layer can provide structural strength for the current collectors to prevent the wrinkle or rupture of the metal foil after many times of bending or in the situation of over-bending. The edge of the current collector is covered by the sealing frame, the supporting region which has ability of adhesion, and the protective layer. Because the sealing frame, the supporting region, and the protective layer are not conductive, the chance of an outer short resulting from accidental contacting of the positive current collector and the negative current collector can be reduced.

Moreover, the active material layers of the battery are isolated via the separation region and the supporting region of the electrical insulator. The supporting region can further be a barrier between the active material layers to prevent the cracking of the separation region. Therefore, the situation of inner shorts can be prevented, and the ceramic battery which has high content of ceramics can be achieved.

The invention being thus described, the same may be varied in many ways. Such variations are not to be regarded as a departure from the spirit and scope of the invention, and all such modifications are intended to be included within the scope of the following claims.

The invention claimed is:

1. A battery, comprising:
   two electrodes, each of the electrodes having an active material layer and a current collector;
   an electrical insulator, disposed between the active material layers to make the active material layers be insulated from each other, the electrical insulator covering one of the electrodes, the electrical insulator comprising:
   a separation region, having two opposite surfaces and a lateral surface, disposed between the active material layers and contacting the active material layers with the two surfaces respectively, wherein the separation region is not larger than one of the active material layers; and
   a supporting region, disposed at an edge of at least one of the two opposite surfaces of the separation region, wherein the supporting region is non-ion-conductive and is disposed between the active material layers, and wherein at least a part of the supporting region contacts the active material layers and covers part of one of the two opposite surfaces of the separation region and the lateral surface; and
   a package structure, packaging the electrodes and the electrical insulator.

2. The battery as claimed in claim 1, wherein the separation region is a ceramic separator.

3. The battery as claimed in claim 1, wherein the separation region is a polymer separator.

4. The battery as claimed in claim 1, wherein the separation region is a ceramic coated polymer separator.

5. The battery as claimed in claim 1, wherein the supporting region is further disposed on a part of or all of the lateral surface of the separation region.

6. The battery as claimed in claim 1, wherein the package structure is further an independent container to accommodate the electrodes and the electrical insulator.

7. The battery as claimed in claim 1, wherein the battery is a pouch battery or a flexible battery.

8. The battery as claimed in claim 1, wherein an outer surface of at least one of the current collectors further comprises a protective layer.

9. The battery as claimed in claim 8, wherein a material of the protective layer is polyimide, epoxy resin, acrylic resin or silicone.

10. A battery, comprising:
    two electrodes, each of the electrodes having an active material layer and a current collector;
    an electrical insulator, disposed between the active material layers to make the active material layers be insulated from each other, the electrical insulator covering one of the electrodes, the electrical insulator comprising:
    a separation region, having two opposite surfaces and a lateral surface, disposed between the active material layers and contacting the active material layers with the two surfaces respectively, wherein the separation region is not larger than one of the active material layers; and
    a supporting region, disposed at an edge of at least one of the two opposite surfaces of the separation region, wherein the supporting region is non-ion-conductive and is disposed between the active material layers, and wherein at least parts of the supporting region contact the active material layers and cover part of one of the two opposite surfaces of the separation region and the lateral surface; and
    a sealing frame, adhered to the current collectors and at least parts of the supporting area to seal the active materials and the separation region.

11. The battery as claimed in claim 10, wherein the separation region is a ceramic separator.

12. The battery as claimed in claim 10, wherein the separation region is a polymer separator.

13. The battery as claimed in claim 10, wherein the separation region is a ceramic coated polymer separator.

14. The battery as claimed in claim 10, wherein the supporting region further is disposed on a part of or all of the lateral surface of the separation region.

15. The battery as claimed in claim 10, wherein the battery is a pouch battery or a flexible battery.

16. The battery as claimed in claim 10, wherein an outer surface of at least one of the current collectors further comprises a protective layer.

17. The battery as claimed in claim 16, wherein a material of the protective layer is polyimide, epoxy resin, acrylic resin or silicone.

18. The battery as claimed in claim 1, wherein the supporting region has more flexibility than the separation region.

19. The battery as claimed in claim 10, wherein the supporting region has more flexibility than the separation region.

20. The battery as claimed in claim 1, wherein the supporting region is flexible and has added non-ion-conductive particles.

21. The battery as claimed in claim 10, wherein the supporting region is flexible and has added non-ion-conductive particles.

* * * * *